July 14, 1970  R. J. GREENLER ET AL  3,520,669
METHOD OF AND CHAMBER FOR THE MANUFACTURE OF FLOAT GLASS
Filed July 14, 1967  2 Sheets-Sheet 1

ROBERT J. GREENLER
ROBERT J. THOMPSON
INVENTORS

BY
John R. Faulkner
William E. Johnson
ATTORNEYS

July 14, 1970   R. J. GREENLER ET AL   3,520,669
METHOD OF AND CHAMBER FOR THE MANUFACTURE OF FLOAT GLASS
Filed July 14, 1967   2 Sheets-Sheet 2
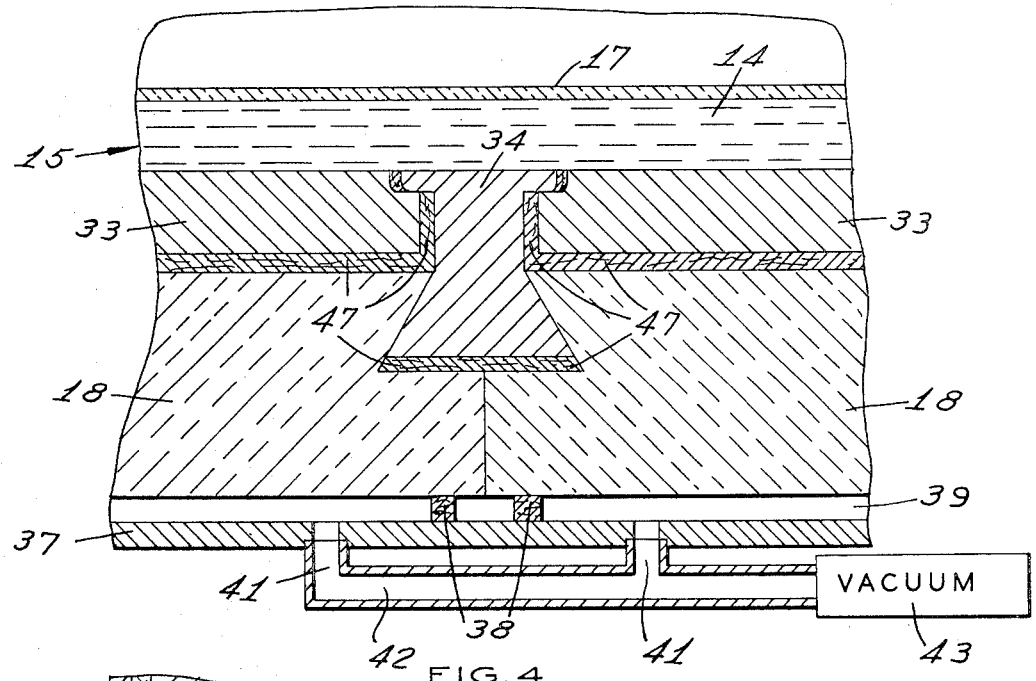
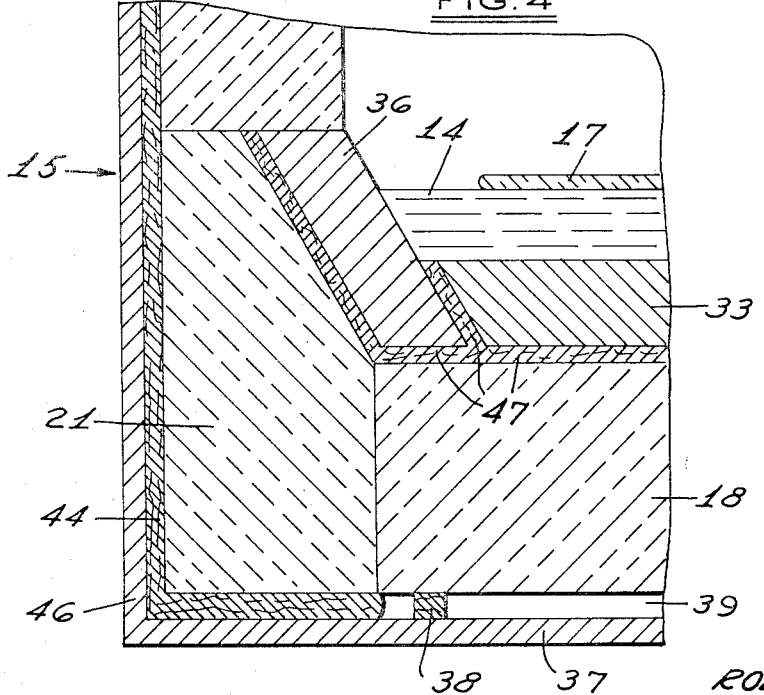
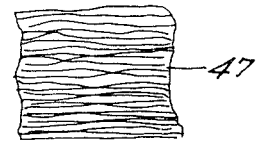
ROBERT J. GREENLER
ROBERT J. THOMPSON
INVENTORS
BY
John R. Faulkner
William E. Johnson
ATTORNEYS – # United States Patent Office 3,520,669
Patented July 14, 1970

3,520,669
METHOD OF AND CHAMBER FOR THE MANUFACTURE OF FLOAT GLASS
Robert J. Greenler and Robert J. Thompson, Monroe, Mich., assignors to Ford Motor Company, Dearborn, Mich., a corporation of Delaware
Filed July 14, 1967, Ser. No. 653,385
Int. Cl. C03b 18/02
U.S. Cl. 65—27                                    16 Claims

ABSTRACT OF THE DISCLOSURE

A chamber utilized in the "float process" of manufacturing glass has a molten tin bath contained in the bottom thereof. The bottom of the chamber is defined by refractory blocks having a graphite liner thereover. A layer of fibrous, insulating, carbonaceous material, both solid at the operational temperatures of the chamber and non-wettable by molten tin, such as graphite felt, is interposed between the refractory blocks and the liner. The fibrous material is gas-permeable thereby allowing a vacuum system, effective to the top of the liner, to reduce "chemical reacion bubbling" in the chamber. The carbonaceous material also acts as an insulating material and both increases the temperature in the hot end of the chamber and reduces the thermal gradient across the refractory blocks thereby reducing the "thermal transpiration bubbling" of the chamber.

BACKGROUND OF THE INVENTION

This invention relates to the construction and operation of a chamber for utilization in the manufacture of flat glass by the so-called "float process." In the "float process," molten glass is poured on the surface of a molten bath contained in a chamber to obtain a glass ribbon having true parallelism of its opposite faces and a lustrous, fire-polished finish.

Generally, in the "float process" the molten bath is formed from metal having a density greater than that of molten glass. By known means, the molten glass is delivered at a uniform rate to the surface of the molten bath to form a ribbon of glass. The ribbon is then advanced along the surface of the bath under thermal conditions which permit the leading portion thereof to continuously harden to a degree sufficient to permit its removal from the bath without harm to the surfaces thereof. Upon its removal from the chamber, the ribbon of glass passes through an annealing lehr and is subjected to further conventional processing.

The molten bath, which supports the glass, is contained within a substantially enclosed chamber having upper and lower refractory sections joined by side and end wall structures. The end wall structures have therein entrance and exit passageways through which, respectively, the molten glass is fed to and the glass ribbon removed from the chamber. The lower refractory section forms the container for receiving and supporting the molten metal bath. The space within the chamber above the bath is filled with a protective atmosphere to prevent oxidation of the metal forming the bath.

The "float process" of manufacturing glass has been improved by lining at least a portion of the chamber containing the molten metal bath with slabs of a carbonaceous material. Such slabs, usually made from graphite, are positioned in the chamber in a manner and for a purpose more fully disclosed in copending U.S. patent applications, Ser. No. 409,664, filed Nov. 9, 1964, now abandoned, and Ser. No. 497,949, filed Oct. 19, 1965, now Patent 3,393,061, both of which are assigned to the same assignee as this application.

The utilization of a carbonaceous liner in a float chamber has substantially reduced the phenomenon generally referred to as "thermal transpiration bubbling." This bubbling is caused when a portion of the atmosphere of the chamber is drawn down the side wall edges of the chamber and then out under and up through the bottom refractory lining of the chamber. The atmosphere passes up through the refractory as this material is porous on a microscopic scale. A good portion of the bubbles of atmosphere gas passing through the bath come into engagement with the underside of the glass ribbon floating on the bath. This engagement causes an indentation in the glass and results in a subsequent scrapping of that portion of the glass.

Utilization of a carbonaceous liner has substantially reduced the problem of "thermal transpiration bubbling" in the float chamber as such a liner is another physical barrier between the refractory lining and the glass ribbon. However, carbonaceous material such as graphite is porous and a number of bubbles do pass upwardly through this additional barrier and into engagement with the underside of the glass to indent the same.

Another advancement over prior float chambers in the use of a carbonaceous liner is found in the fact that the liner chemically interacts with the oxygenous impurities of both the atmosphere and of the molten metal bath associated therewith so as to purge the "float chamber" system of impurities which would otherwise contaminate it. When a prior art, non-carbon lined chamber is utilized in the "float process" of manufacturing glass, there is a tendency for foreign contaminants seeping into the system to react selectively with the metal forming the molten bath. When the metal is tin, the reaction products, such as a tin oxide, are drawn by some mechanism into the surface of the glass contacting the tin in the chamber and subsequently cause a defect known as "bloom." "Bloom" is the descriptive title applied to glass in which tin oxides on the surface thereof become iridescent upon reheat of the glass to bending temperatures and thus become visible to the eye.

By utilization of a carbonaceous liner in the float chamber, the defect of "bloom" is substantially reduced as impurities in the chamber react selectively with the liner rather than with the metal bath. However, because of the chemical interaction between the carbonaceous liner, the atmosphere and the molten metal bath, bubbling is produced in the bath to a minor degree when the chemical interaction occurs. This phenomenon is known as "chemical reaction bubbling" and some of the bubbles produced pass up through the bath and come into engagement with the underside of the glass ribbon floating on the bath. This engagement results in an indentation in the surface of the glass and causes a subsequent scrapping of at least that portion of the glass.

Thus, the utilization of a carbonaceous liner in a chamber for the "float process" of manufacturing flat glass has proved extremely beneficial in the area of both eliminating "bloom" from the finished glass and by substantially reducing the "thermal transpiration bubbling." However, in a chamber utilizing a carbonaceous liner, there is still occasional "thermal transpiration bubbling" and "chemical reaction bubbling," which two forms of bubbling cause defects in the glass being produced by the float process.

The prior art teaches the process of drawing a vacuum on the bottom of the chamber containing the molten bath in order to reduce the "thermal transpiration bubbling." By drawing such a vacuum at least a portion of the atmosphere moving to the bottom of the refractory is drawn off. Such a vacuum system, however, is not totally effective to eliminate the bubbling which occurs in the chamber.

SUMMARY OF THE INVENTION

This invention is directed to a method of and a chamber for utilization in the "float process" of manufacturing glass and, more particularly, the invention is directed to the method of operating and construction for such a chamber which results in a substantial reduction, and almost total elimination of, both the "thermal transpiration bubbling" and the "chemical reaction bubbling" which occur in such a chamber. The improved chamber also retains an increased amount of heat in the entrance and glass flow-out zone thereof.

The chamber for manufacturing glass is constructed in accordance with the principles and teachings of this invention in the following manner. Refractory ceramic blocks are utilized to define a cavity, the cavity receiving molten tin therein which defines a bath for receiving a glass ribbon thereon. The glass ribbon is formed by pouring molten glass out upon the tin bath at an entrance end of the chamber. The glass flows out on the bath to a width narrower than the width of the tin bath. Portions of the molten tin, outside the edges of the ribbon, are exposed to the interior of the chamber. An atmosphere gas, substantially inert both to carbonaceous material and to molten tin, is supplied to the interior of the enclosed chamber. A liner of carbonaceous material, submerged at least partly within the molten tin bath, extends at least partly across the bath. The carbonaceous material of the liner reacts with oxygenous impurities in both the atmosphere gas and the tin bath in order to rid the chamber of the impurities. A layer of fibrous, insulating, carbonaceous material is placed between the carbonaceous liner and the refractory blocks at least along a portion of the length of the refractory blocks defining the portion of the enclosed chamber wherein the glass is initially flowed out upon the molten tin bath. The fibrous, insulating, carbonaceous material both aids in increasing the heat retention ability of the flow-out portion of the chamber and aids in reducing both "thermal transpiration bubbling" and "chemical reaction bubbling."

The fibrous material interposed between the graphite liner and the refractory blocks is a good heat insulator and, as such, the temperature of the top of the refractory blocks defining the container for the molten tin is reduced substantially below the temperature that the top of such blocks would be if no insulating material was utilized in conjunction therewith. By reducing the temperature of the top of the refractory blocks, the thermal gradient from the top of the blocks to the bottom thereof is also reduced. This particular thermal gradient is the driving force in the "thermal transpiration bubbling" and seeing as this gradient is substantially reduced, the bubbling is also substantially reduced.

Also, in view of the fact that the fibrous, carbonaceous material is non-permeable with respect to tin, a vacuum path is provided from the area below the refractory blocks through the porous refractory blocks, through the fibrous insulating material, and through the porous carbonaceous liner to the interfacial area between the carbonaceous liner and the molten tin making up the bath. This interfacial area is the predominant area at which the "chemical reaction bubbling" takes place. By utilization of the fibrous insulating layer, the vacuum system is effective to this interface and as bubbles form, the gaseous material forming the bubbles is drawn down through the liner, the fibrous material, the refractory blocks and into the vacuum system.

Thus, the fibrous, insulating, carbonaceous material which is a good heat insulator and substantially non-permeable with respect to tin, when interposed between the carbonaceous liner and the refractory blocks in a float chamber, is effective to substantially reduce both the "thermal transpiration bubbling" and the "chemical reaction bubbling."

In a more detailed embodiment of the float chamber of this invention, the fibrous, insulating, carbonaceous material is interposed between all adjacent surface disposed at, or below, the level of the molten tin in the bath and above the open area underneath the lower refractory blocks. More particularly, fibrous, carbonaceous material, such as graphite felt, is interposed between the carbonaceous liner and the elements holding the liner in position with respect to the refractory blocks and between the liner and side wall carbonaceous liners.

BRIEF DESCRIPTION OF THE DRAWINGS

FIG. 3 is a partial, longitudinal sectional view of the improved chamber taken along line 3—3 of FIG. 2 showing, in detail, features of the chamber. FIG. 4 is a view showing a transverse portion of the improved chamber taken along line 4—4 of FIG. 2. FIG. 5 is a pictorial representation of a fibrous, insulating, carbonaceous material.

DESCRIPTION OF THE PREFERRED EMBODIMENT

Figure 1:
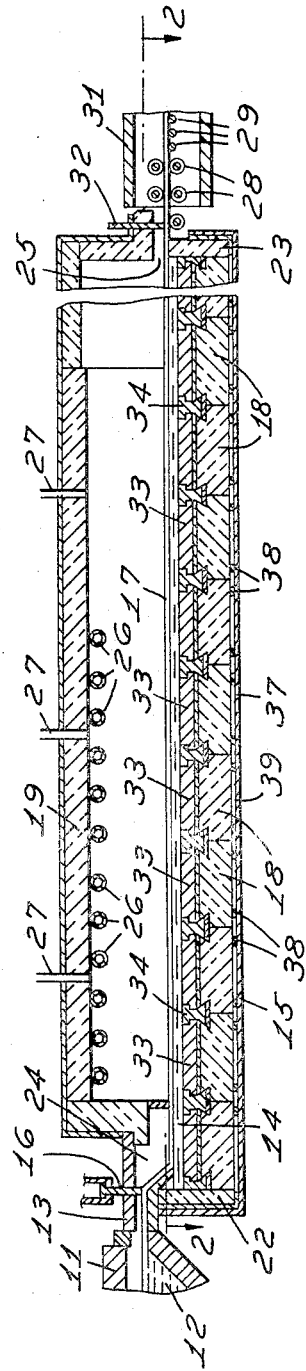
FIG. 1 is an elevational view, in cross section, showing the improved chamber of this invention for utilization in the manufacture of flat glass.

Referring now to the drawings, in FIG. 1 there is seen the delivery end of a conventional glass melting furnace 11 in which a constant level of glass 12 is maintained. The molten glass 12 is delivered through a forehearth 13 onto the surface of a bath 14 of molten metal contained within a chamber 15. A tweel 16 controls the rate of glass 12 flowing from the furnace 11. The molten bath 14 has a density greater than that of glass 12 so that the glass will float on the surface thereof. By delivering molten glass at a constant rate and by withdrawing a continuous sheet of glass thus formed at a constant rate, a continuous ribbon of glass 17 of uniform width is produced. Preferably, the bath 14 is molten tin but an alloy of tin may also be utilized.

The chamber 15 comprises a lower refractory section 18, an upper refractory section 19, refractory side blocks 21 and refractory end walls 22 and 23, all of which refractory walls or sections are both formed from a plurality of refractory blocks and joined together except for a restricted entrance 24 and exit 25 to provide the substantially enclosed chamber 15. The refractory side blocks 21 and the refractory end walls 22 and 23 project above the top surface of the lower refractory section 18 to define the container for the bath of molten tin 14.

To maintain the tin in a molten condition and the glass ribbon 17 at the proper temperatures required to form a ribbon of good optical quality, heaters such as electrical heaters 26 (FIG. 1) are installed in the roof of the chamber 15. Coolers may also be provided in zones of the chamber 15 to assure that the glass ribbon 17 will be sufficiently cooled and hardened to be removed through the exit 25 without damage to the ribbon. The electrical heaters 26 are connected to a conventional power source (not shown) and may be individually controlled to provide the desired thermal gradient between the various zones of the chamber 15 thereby to obtain the desired rate of cooling of the ribbon 17 as it progresses through the various zones of the chamber. Preferably, the molten glass 12 is introduced into the chamber 15 at a temperature of about 1850° F. and then, as the glass solidifies to form the ribbon 17, it is progressively cooled to a temperature of about 1100° F. at the exit 25.

An atmosphere gas is introduced into the chamber 15 through gas inlets 27 in order to provide a protective atmosphere within the chamber above the molten tin and glass floating thereupon. The atmosphere gas should be inert toward both carbonaceous material and the tin making up the bath and actively reducing toward tin oxide. Also, the atmosphere gas should contain not more than traces of oxygen, carbon dioxide or water vapor. As more fully described in U.S. Pat. 3,332,763 assigned to the same assignee as this application, a protective atmosphere consisting essentially of 4% carbon monoxide, 4% hydrogen and the remainder nitrogen is the preferred inert atmosphere.

The cooled glass ribbon 17 is withdrawn by driven traction rollers 28 onto a conveyor 29 to enter an annealing lehr 31 where the ribbon 17 is further cooled under controlled conditions to remove or reduce residual stresses therein. The exit 25 of the chamber 15 may be provided with a sealing member 32 to retain the protective atmosphere gas in and prevent the entrance of outside atmosphere into the chamber 15.

Figure 2:
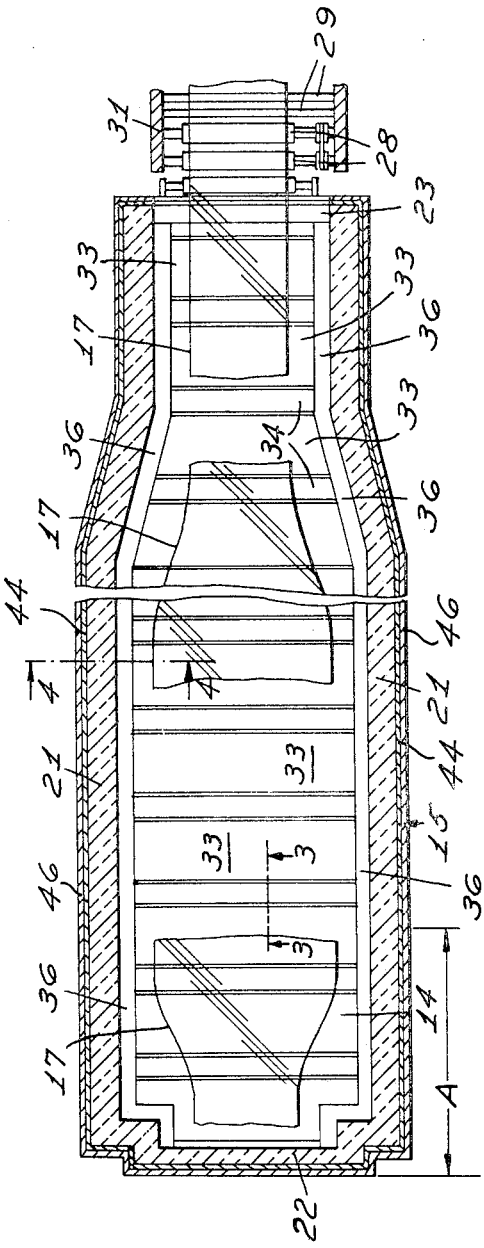
FIG. 2 is a plan view, in cross section, of the improved chamber of FIG. 1.

As described in previously mentioned Pat. 3,393,061, a series of rectangular slabs 33, preferably of solid carbonaceous material, such as graphite, are provided in the chamber 15. As best seen in FIG. 2, the slabs 33 are installed so as to cover the entire bottom area of the chamber 15.

While in FIG. 2, the individual slabs 33 are shown as running the full width of the chamber 15, it should be appreciated that the slabs 33 are preferably coextensive with the individual blocks defining the lower refractory section 18. More particularly, the number of slabs 33 utilized to line one width of the chamber 15 is preferably both equal in number to and identical in size with the transverse series of slabs, is held in a position by a transverse width of the lower refractory section. The slabs 33 are generally coextensive with the refractory blocks defining the lower refractory section such that upon the reutilization of the chamber if any upheaval in the lower refractory blocks occurs, the individual liner slabs 33 will readily adjust to the situation and there will be no buckling or cracking of a unitary piece of graphite material.

With reference to FIGS. 1 and 2, each slab 33, or transverse series of slabs, is held in a position by a transversely extending key or keys 34. The keys are generally shorter in length than the slabs and a greater number of keys extend across the width of the chamber. The manner of utilizing the keys and slabs is described in the above mentioned Pat. 3,393,061. The key 34 is made from the same material as the slab.

The slabs 33 and keys 34, since they are preferably made from graphite, which is substantially less dense than the tin, are raised above the lower refractory section 18 by a buoyant force exterted thereon by the molten tin. The graphite slabs and keys do not rise to the top surface of the tin and float thereupon because of the manner in which the keys 34 are supported by the lower refractory section 18. A depth of tin bath above the slabs 33 is maintained at a level of from ½ to 4 inches in order to reduce the likelihood of the glass ribbon coming into contact with the slabs 33 if and when the glass ribbon buckles within the chamber 15.

As best seen in FIG. 4, the refractory side blocks 21 extend above the top surface of the lower refractory blocks 18. A side wall liner 36, comprising one continuous, or in the alternative, several slabs of a carbonaceous material such as graphite, is mounted by suitable members (not shown) adjacent the side blocks 21 for the entire length of each side of the chamber 15. The side wall liner 36 is utilized to provide protection for the side refractory blocks 21 in the event that the glass ribbon 17 ruptures and a portion thereof moves towards the side wall of the chamber 15.

With reference to FIGS. 3 and 4, some of the details of the chamber 15 are shown, which details are omitted from the views in FIGS. 1 and 2. More particularly, the bottom refractory blocks 18, making up the lower refractory section, are supported above the bottom outside wall 37 of the chamber 15 by means of shims 38 of steel or a refractory material. The purpose of shimming the lower refractory blocks 18 above the bottom wall 37 is to insure that the upper or top surface of each of the blocks is parallel and level with its adjacent blocks so that the blocks collectively define a smooth, level surface. By shimming the blocks above the bottom wall, a free space or chamber 39 is provided therebelow. The chamber 39 generally has a height varying from ¼ to ½ inch.

With reference to FIG. 3, ports 41 are provided in the bottom outside wall 37 of the chamber 15 and these ports are connected by a line 42 to a vacuum source 43. Both the position at which, and the purpose for drawing a vacuum on the under portion of the refractory bottom blocks 18 will be described in detail below.

With reference to FIG. 4, a ramming mix 44 is utilized to fill the space between the refractory side blocks 21 and the outside wall 46 of the chamber 15. This ramming mix extends down the side of the blocks 21 and therebelow to support the same. However, the ramming mix terminates under the first lower refractory block 18. The purpose of the refractory ramming mix is to secure the refractory side blocks 21 in spaced insulated relationship to the side and bottom walls 46 and 37, respectively, of the chamber 15. The refractory ramming mix 44 is porous in nature.

In accordance with the principles and teachings of this invention, a carbonaceous, fibrous insulating material 47, such as a preferred graphite felt material shown pictorially in FIG. 5, is utilized as a lining material between all of the individual elements forming the chamber. More particularly, as shown in FIG. 1, the carbonaceous, fibrous insulating material 47 is disposed between the graphite slabs 33 and the top surface of the bottom refractory blocks 18. The fibrous material is also disposed both between the keys 34 and the end surfaces of respective ones of the graphite blocks 33, as indicated in FIG. 3, and below the key 34 and above the refractory block at the keyed out portions of the refractory blocks 18.

With reference to FIG. 4, it may also be seen that not only is the fibrous, carbonaceous material disposed below the graphite slabs 33 and above the top surface of the lower refractory blocks 18, but such material is also disposed between the edge of the graphite slab 33 and the outside edge of the side wall liner 36. Such material may be disposed between the key 34 and the side wall liner 36 in a manner identical to that shown in FIG. 4 for the placement of such material between the slab 33 and the side wall liner 36. The carbonaceous, fibrous insulating material 47 is likewise disposed both between the side wall liner 36 and the refractory side blocks 21 and below the side wall liner 36 in the area above the refractory side blocks 19. Thus, in effect, all open cavities or joints between elements of the structure forming the chamber 15, from at least the area at the top of the graphite slabs 33 to the bottom of the lower refractory blocks 18, are lined with a layer of the carbonaceous, fibrous material. This material performs and functions in the manner which will be described below.

The preferred graphite felt material may be purchased from National Carbon Company, Division of Union Carbide as Graphite Felt WDF. Also, other forms of fibrous, insulating, carbonaceous material such as graphite and carbon cloth, carbon felt, graphite and carbon fibers are available from National Carbon Company and may be utilized as the insulating material in place of or in conjunction with the preferred graphite felt material.

With reference to FIG. 2, the leading portion of the chamber, indicated by the letter "A," is the flow-out zone of the chamber and, in this zone, the glass flows out from the forehearth 13 onto the molten bath 14. In this particular zone, the chamber is maintained at its hottest temperature. In this regard, the predominant portion of the "thermal transpiration bubbling" and "chemical reaction bubbling" occur in this hot zone. It is in this flow-out zone in the chamber that the vacuum system 43 is connected by port 41 to the chamber 39 below the refractory blocks 18. A plurality of ports 41, within a few inches of one another, may be located throughout this zone.

The "thermal transpiration bubbling" occurs when atmosphere above the molten bath passes through the upper refractory blocks 21, down through the refractory ramming mix 44, and outwardly under the lower refractory blocks 18. Although a portion of the atmosphere moving through such a path is withdrawn by action of the vacuum from the vacuum source 43, some of the atmosphere does pass upwardly through the lower refractory blocks 18 and subsequently into engagement with the underside of the glass ribbon 17 floating on the molten bath 14.

The utilization of the graphite liner 33, on its own accord, has substantially reduced this phenomenon of "thermal transpiration transpiration bubbling." However, by employment of the fibrous, insulating, carbonaceous material 47 in the space between the graphite liner slabs 33 and the lower refractory block 18, the phenomenon of "thermal transpiration bubbling" has been eliminated almost totally. More particularly, employment of the fibrous, carbonaceous material 47 in this particular position insulates the refractory lower block 18 from the molten bath 14 and the liner 33 whereby the temperature of the upper surface of the refractory block 18 is reduced. By reducing the temperature of the upper surface of the refractory block 18, the temperature gradient across the entire block is reduced. This temperature gradient is the driving force in the "thermal transpiration bubbling" phenomenon and seeing as this driving force is reduced by insulation, the amount of this bubbling is thereby significantly reduced to the point of almost total elimination.

As to the "chemical reaction bubbling" phenomenon, this particular phenomenon generally occurs at the interface between the molten bath 14 and the slabs 33 or keys 34. Interpostion of the fibrous, carbonaceous material 47 between all the various elements from the bottom of the refractory blocks 18 to the top of the graphite slabs 33 has allowed the vacuum system to function more effectively through a longer distance. Since the carbonaceous material 47 is not wetted or permeated by the molten tin, the vacuum system effectively acts through the lower refractory blocks, the gas-permeable, fibrous material and the porous graphite keys or slabs 34 and 33, respectively. Thus, any gas bubbles developing because of "thermal transpiration bubbling" at the interface of the graphite keys, slabs or side wall liner are drawn down through the associated graphite member, the fibrous material and the associated refractory block and out through the vacuum system. Thus to improve the vacuum system, the fibrous, carbonaceous material must line the area of the chamber overlying the vacuum system. However, the remainder of the chamber may also be lined for heat insulation purposes.

By lining the chamber 15, under the flow-out zone thereof, the retention of heat within the zone is increased so that sufficient heat is available to permit the glass to flow out upon the molten bath 14 without difficulties. Also, by putting the fibrous material in between the slabs 33 and keys 34, the rate of heat transfer longitudinally along the chamber 15 is substantially reduced whereby the heat loss from the hot end of the chamber by conduction through the graphite is substantially reduced. The rate of heat transfer is reduced because the area of physical contact between the keys and slabs is reduced thereby reducing the heat conduction points between them.

If the vacuum chamber 39 becomes filled with molten tin by seepage thereinto, the port 41 can be extended by drilling through the solidified tin and directly into the porous refractory block 18. However, since the chamber is lined with the fibrous material, the amount of seepage of tin is reduced as the tin tends to solidify before seeping into the free space or cavity under the refractory blocks.

In a test chamber, the thickness of the graphite liner was 2 inches and the thickness of the refractory bottom blocks was 12 inches. In the flow-out zone of the chamber, a tin depth of $1\frac{3}{16}$ inches was maintained and a 1-inch layer of graphite felt insulation material was interposed between the graphite liner and the refractory blocks. The test chamber was approximately 50 feet in length and in areas of the chamber other than the flow-out zone thereof the tin depth was maintained at a thickness of $2\frac{3}{16}$ inches. The heating elements were positioned approximately 10 inches above the tin bath and the overall height of the chamber above the tin bath was approximately 20 inches. The tin bath was 80 inches wide at the flow-out zone thereof and was reduced to 58 inches in width at the colder end thereof.

The flow-out zone of the chamber was maintained at a temperature in the general range of 1975° F. This temperature of the flow-out zone was approximately 50–75° F. above the temperature at which this particular zone would be when the chamber was operated without the graphite felt insulation. In using the test chamber, a significant reduction was observed in the number and occurrences of defects in the glass due to indentations therein caused by "thermal transpiration bubbling" and "chemical reaction bubbling."

The dimensions given relative to the test chamber are in no way intended to limit the scope of the invention as set forth in the appended claims. It is understood that the above test chamber specifications are merely descriptive and illustrative of the value of utilization of fibrous, insulating, carbonaceous material in such a glass manufacturing chamber.

The term "graphite" as used herein, shall be construed to include all forms of elemental carbon.

Many modifications of the basic concept of this invention would be obvious to one skilled in the art in view of the teachings of this invention. It is intended that all modifications which fall within the true spirit and scope of this invention be included within the spirit and scope of the appended claims.

We claim:

1. The method of reducing the rate of heat transfer along the length of a chamber utilized in the manufacture of flat glass comprising supplying a molten tin bath to a cavity defined in a refractory ceramic material and contained in a substantially enclosed chamber supplying an atmosphere therein substantially non-reactive with molten tin and carbonaceous material, said cavity having a liner thereover formed of graphite keys and graphite liner slabs in alternating rows which extend across the width of the bath, said keys anchoring said slabs and in turn being anchored to said refractory material; flowing molten glass out upon said bath; insulating said keys from said liner slabs by interposing therebetween a layer of insulating, fibrous carbonaceous material solid at the operational temperatures of said chamber and non-wettable by said molten tin to reduce the physical contact between said liner slabs and said keys so as to reduce the heat transfer conduction points therebetween and said keys and said slabs are primarily in spaced, insulated relationship with one another whereby the rate of heat transfer along the length of said chamber is reduced and the loss of heat from the entrance end of said chamber is substantially reduced.

2. The method of reducing the number of indentation defects caused by gas bubbling in a glass ribbon comprising supplying a molten tin bath to a cavity defined in a refractory, ceramic material and contained in a substantially enclosed chamber; supplying an atmosphere therein substantially non-reactive with tin and carbonaceous material; flowing molten glass out upon said bath; installing a graphite liner over at least a portion of the bottom of said cavity defined by said refractory material; reacting said liner with oxygenous impurities in said atmosphere and in said molten tin bath to rid said chamber of said impurities; and interposing a layer of insulating fibrous carbonaceous material solid at the operational temperatures of said chamber and non-wettable by said molten tin between said liner and said refractory material to reduce the temperature differential across said refractory material from the top surface to the bottom surface thereof so that the thermal driving force causing movement of gaseous materials through said refractory material is reduced and the number of indentation defects in said ribbon caused by gas bubbles engaging the same is likewise reduced.

3. The method of reducing the number of indentation defects caused by gas bubbling in a glass ribbon comprising supplying a molten tin bath to a cavity defined in a refractory ceramic material and contained in a substantially enclosed chamber; supplying an atmosphere therein substantially non-reactive with tin and carbonaceous material; flowing molten glass out upon said bath; installing a graphite liner over at least a portion of the bottom of said cavity defined by said refractory material; reacting said liner with oxygenous impurities in said atmosphere and in said molten tin bath to rid said chamber of impurities; interposing a layer of gas permeable, insulating fibrous carbonaceous material solid at the operational temperatures of said chamber and non-wettable by said molten tin between said graphite liner and said refractory material to reduce the temperature differential across said refractory material from the top surface thereof to the bottom surface thereof so that the thermal driving force causing movement of gaseous materials through said refractory is reduced; and drawing a vacuum on the bottom portion of said refractory material whereby gas bubbles forming on said graphite liner when it interacts with said oxygenous impurities are drawn down through said liner, said insulating material, and said refractory material so that the number of indentation defects in said ribbon caused by gas bubbles engaging said ribbon while it floats upon said molten metal bath are substantially reduced.

4. A substantially enclosed chamber utilized in the float process of manufacturing glass which comprises: refractory ceramic blocks defining a cavity; molten tin received in said cavity to define a bath for receiving and supporting a ribbon of glass thereon, molten glass being poured upon said bath at an entrance end of said chamber to flow-out on said bath to form said ribbon of glass with a width narrower than the width of said bath so that portions of said molten tin bath lie outside the edges of said ribbon and are exposed to the interior of said chamber; means for supplying to said interior of said enclosed chamber an atmosphere substantially inert both to carbonaceous material and to said molten tin; a graphite liner means submersed at least partly within said molten tin bath and extending at least partly across the width of said bath for reacting with oxygenous impurities in both said protective atmosphere and said tin bath to rid said chamber of said impurities; and a fibrous insulating carbonaceous material means solid at the operational temperatures of said chamber and non-wettable by said molten tin located between said liner means and said refractory blocks at least along a portion of the length of said refractory blocks defining the portion of said enclosed chamber wherein said glass is initially flowed out upon said molten metal bath for increasing the heat retention ability of said flow-out portion of said chamber.

5. A chamber utilized for the manufacture of flat glass which comprises: a refractory ceramic material defining a cavity; a molten tin bath received and supported in said cavity; a graphite liner overlying at least a portion of an upper surface of said refractory material defining the bottom of said cavity; and an insulating fibrous carbonaceous material means solid at the operational temperatures of said chamber and non-wettable by said molten tin for increasing the heat retention ability of said lined cavity disposed between at least a portion of said liner and said portion of said upper surface of said refractory ceramic material defining the bottom of said cavity.

6. A chamber utilized for the manufacture of flat glass which comprises: a refractory ceramic material defining a cavity; a molten tin bath received and supported in said cavity; a graphite liner means for overlying at least a portion of said refractory material defining the bottom of said cavity; graphite means anchored in said refractory material for supporting said liner means in a position above and spaced from said refractory material defining the bottom of said cavity; and a fibrous insulating carbonaceous material means solid at the operational temperatures of said chamber and non-wettable by said molten tin, said material means being disposed between said means supporting said liner and said liner means, between said liner means and said refractory material defining the bottom of said cavity and between said means supporting said liner and said refractory material defining the bottom of said cavity.

7. A chamber utilized for the manufacture of flat glass which comprises: a refractory ceramic material defining a cavity; a molten tin bath received and supported in said cavity; a graphite liner means for overlying at least a portion of said refractory material defining the bottom of said cavity; and a fibrous, insulating carbonaceous material means solid at the operational temperatures of said chamber and non-wettable by said molten tin located between said refractory material and said liner means for providing heat insulation therebetween, lower and upper surfaces of said fibrous material means being respectively in engagement with the upper surface of said refractory material and with the lower surface of said liner means.

8. A chamber utilized for the manufacture of flat glass which comprises: a plurality of refractory ceramic blocks defining an elongated cavity; a molten tin bath received and supported in said cavity; a plurality of graphite liner block means for protecting said cavity; means for supporting said plurality of graphite liner block means above and in spaced relationship to said refractory blocks defining the bottom of said cavity when said molten bath is contained in said cavity; and a fibrous, insulating carbonaceous material means solid at the operational temperatures of said chamber and non-wettable by said molten tin located between said liner block means and said means supporting said liner block means, between said liner block means and said refractory ceramic blocks, and between said means for supporting said liner block means and said refractory ceramic blocks for providing heat insulation therebetween.

9. A chamber utilized for the manufacture of flat glass which comprises: a plurality of refractory ceramic blocks defining an elongated cavity having longitudinal side walls and a bottom surface; a molten tin bath received and supported in said cavity; a plurality of graphite liner blocks; a plurality of graphite keys both interposed and interengaged with said graphite liner blocks, said keys being anchored to said refractory ceramic blocks defining the bottom surface of said cavity; and graphite felt insulating material interposed between said liner blocks and said refractory blocks.

10. The chamber for the manufacture of flat glass as defined in claim 9 further comprising: graphite felt insulating material between said liner blocks and said keys.

11. The chamber for the manufacture of flat glass as defined in claim 10 further comprising: graphite felt insulating material between said keys and said refractory blocks.

12. The chamber for the manufacture of flat glass as defined in claim 9 further comprising: a graphite side wall liner along at least a portion of each longitudinal side wall of said cavity defined by said refractory blocks; and graphite felt insulating material interposed between said side wall liner and said refractory blocks.

13. The chamber for the manufacture of flat glass as defined in claim 12 further comprising: graphite felt insulating material interposed between said side wall liner and said liner blocks.

14. A chamber for utilization in the manufacture of flat glass which comprises: a bottom casing wall; side casing walls disposed around and extending upwardly from said bottom casing wall; a plurality of refractory ceramic blocks: means for mounting a first portion of said blocks in spaced relationship to said bottom casing wall to define therebetween a free space and said so mounted first portion of said blocks defining the bottom of a cavity; means for mounting a second portion of said blocks both in spaced relationship to said side wall casing and adjacent said first portion of said refractory blocks, said second portion of blocks extending above said first portion of blocks to define the side walls of said cavity; a molten tin bath received and supported in said cavity; a plurality of graphite liner blocks; means for supporting said plurality of graphite liner blocks above and in spaced relationship to said first portion of said refractory blocks; a vacuum system acting on said free space between said bottom casing wall and said first portion of said refractory blocks at least along a portion of the length of said chamber; and a layer of gas-permeable graphite felt material interposed between said first portion of said refractory ceramic blocks and said graphite liner blocks at least along said portion of said chamber upon which said vacuum system acts.

15. A chamber for the manufacture of flat glass as defined in claim 12 wherein said layer of gas-permeable graphite felt material extends the full lentgh of the chamber.

16. A chamber for the manufacture of flat glass as defined in claim 15 further comprising: graphite side wall liners along said side walls of said cavity; and a layer of gas-permeable graphite felt material interposed between said refractory ceramic blocks and said side wall liner, and between said liner blocks and said side wall liner.

References Cited

UNITED STATES PATENTS

| | | | |
|---|---|---|---|
| 3,140,164 | 7/1964 | Long | 65—99 |
| 3,334,983 | 8/1967 | Badger et al. | 65—99 |
| 3,393,061 | 7/1968 | Greenler et al. | 65—99 |
| 3,428,444 | 2/1969 | Swillinger | 65—99 |

S. LEON BASHORE, Primary Examiner

E. R. FREEDMAN, Assistant Examiner

U.S. Cl. X.R.

65—24, 65, 99, 168, 169, 182